Jan. 19, 1926.  1,570,121
H. A. BERLINER
HELICOPTER
Filed Nov. 9, 1923   2 Sheets-Sheet 1
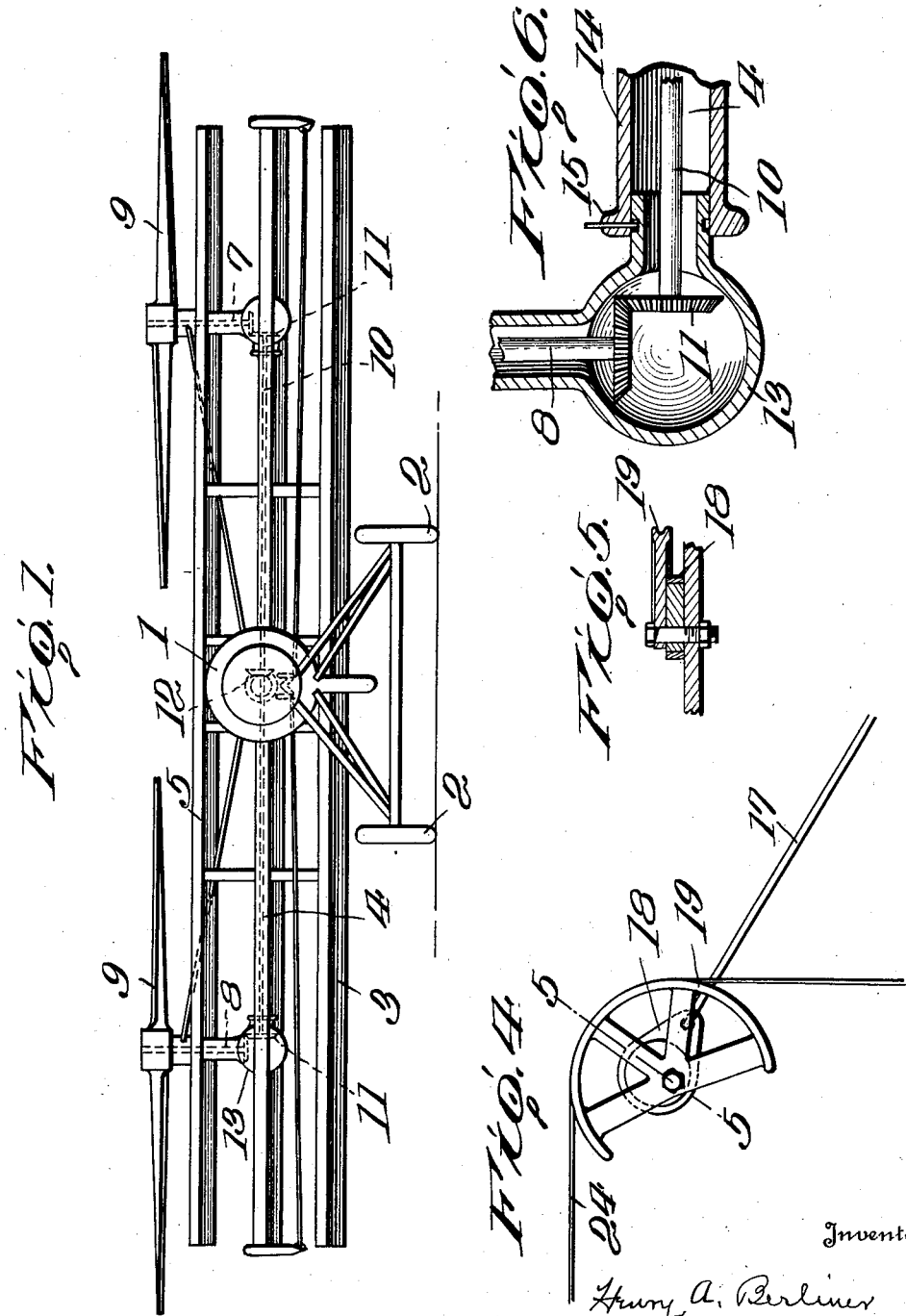

Jan. 19, 1926.  1,570,121
H. A. BERLINER
HELICOPTER
Filed Nov. 9, 1923   2 Sheets-Sheet 2
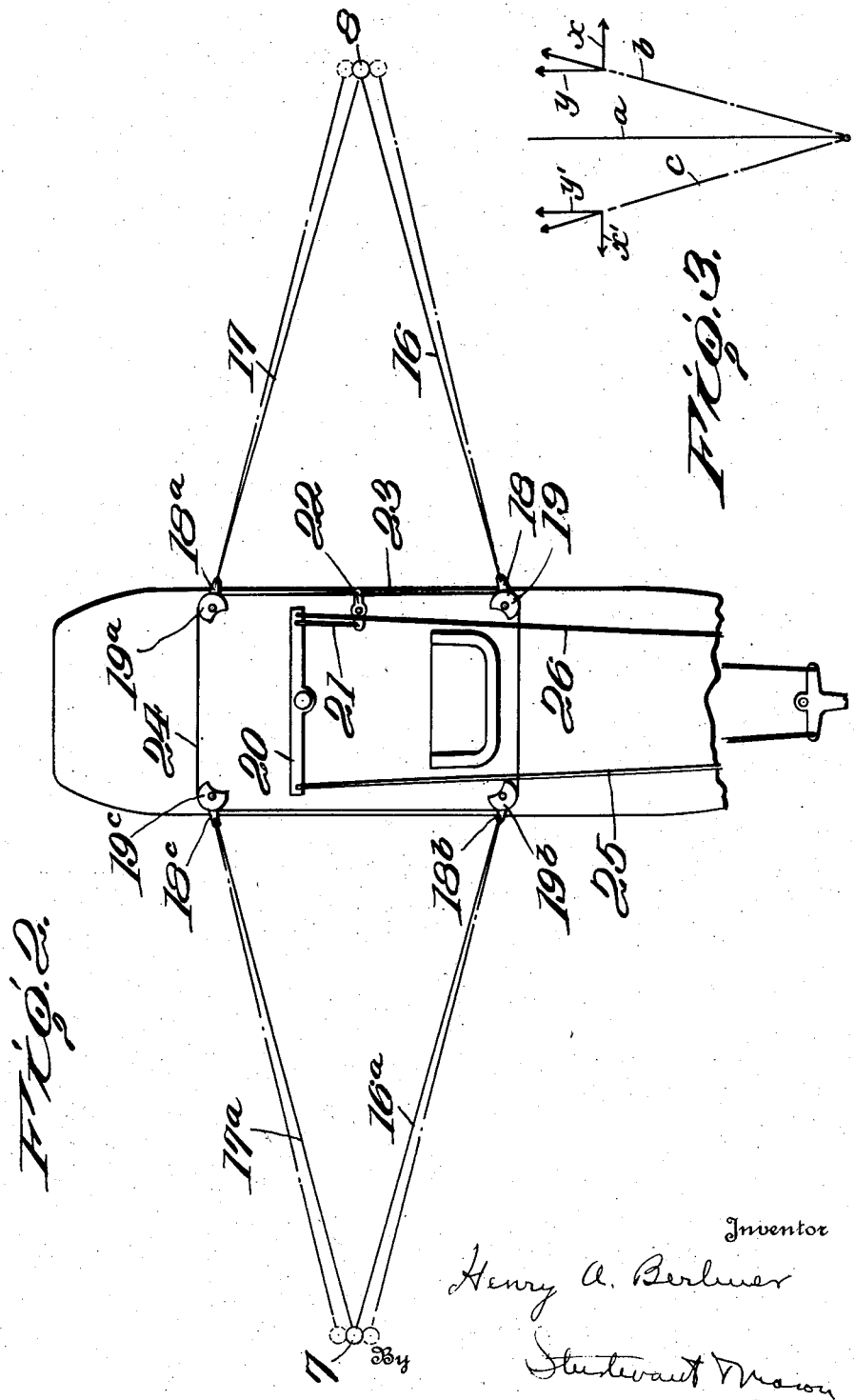

Patented Jan. 19, 1926.

1,570,121

UNITED STATES PATENT OFFICE.

HENRY A. BERLINER, OF WASHINGTON, DISTRICT OF COLUMBIA.

HELICOPTER.

Application filed November 9, 1923. Serial No 673,714.

*To all whom it may concern:*

Be it known that I, HENRY A. BERLINER, a citizen of the United States, residing at city of Washington, in the District of Columbia, have invented certain new and useful Improvements in Helicopters, of which the following is a description, reference being had to the accompanying drawing, and to the fingers of reference marked thereon.

The invention relates to new and useful improvements in helicopters, and more particularly to a helicopter having two or more propellers rotating in opposite directions and adapted to lift and propel the helicopter in a forward direction.

An object of the invention is to provide means whereby the axes of the propellers can be shifted relative to each other, so as to produce a turning movement in a horizontal plane, or for the purpose of creating an unbalanced torque which will aid the helicopter to respond to the rudder control thereof.

In the drawings which show by way of illustration one embodiment of the invention—

Figure 1 is a front view of a helicopter embodying my improvements;

Fig. 2 is more or less of a diagrammatic view in plan showing the arrangement of the parts and the positions to which the propellers may be inclined;

Fig. 3 is a diagrammatic view showing the balance of forces when the propeller shaft is inclined forward and also when inclined aft;

Fig. 4 is an enlarged detail showing one means whereby the propeller shaft may be tilted;

Fig. 5 is a sectional view on the line 5—5 of Fig. 4;

Fig. 6 is a detail showing a mounting for the propeller shaft so that it may be inclined fore and aft.

The helicopter shown in the drawings is preferably of the type shown in my prior application, Serial No. 546,167, filed March 23d, 1922, to which reference may be had for the detail disclosure of the helicopter and only brief reference will be made thereto herein.

Said helicopter includes a fuselage 1, which is provided with the usual supporting wheels 2—2. Extending outwardly from the fuselage are supporting planes 3, 4 and 5. These planes are grouped and located on opposite sides of the fuselage. The upper and lower planes 3 and 5 are continuous, one passing above and the other below the fuselage. This makes a very strong arrangement of the planes, which have little or no yield in a vertical direction, although the planes may be warped slightly by proper pull thereon.

There is a propeller shaft 7 at one side of the fuselage and another propeller shaft 8 at the other side of the fuselage. These propeller shafts carry propellers 9—9, which are of similar construction. The shafts are mounted in suitable housings. These propeller shafts are driven from a horizontal shaft 10 which is mounted in suitable bearings and provided with a beveled gear 11, at each end thereof, which beveled gears mesh with associated beveled gears on the shafts 7 and 8, respectively. The shaft is driven by a beveled gear connection 12 with the engine shaft and as this shaft 10 rotates, it will cause the two propeller shafts 7 and 8 to rotate in opposite directions. The propeller shafts are normally parallel and, therefore, the torque of one propeller will be counterbalanced by the other, to a large extent.

The shafts 7 and 8 are mounted in suitable housings and these housings are supported in bearings. In Fig. 6, I have shown in detail one way of mounting the housings for the shafts 7 and 8. The housing has an elbow part 13, which extends into the housing 14 for the shaft 10, and is held therein by a sleeve connection 15, which permits the elbow housing 13 to turn in the housing 14 and about the axis of the shaft 10. The planes are cut away to a slight extent so as to permit these housings carrying shafts to swing fore and aft in planes parallel to the longitudinal axis of the fuselage.

Connected to the upper end of the housing for the shaft 7 are two rods or flexible members 16 and 17. The member 16 is connected to an eccentric strap 18 co-operating with an eccentric secure to a short stub shaft mounted on the fuselage. On the end of this shaft is a segment pulley 19. The rod or flexible member 17 is connected to an eccentric strap 18ª, which in turn co-operates with an eccentric operated by a segment pulley 19ª. The housing for the shaft 8 is likewise connected by a flexible member 16ᵃ to an eccentric strap co-operating with an eccentric operated by a segment pulley 19ᵇ. The housing of the shaft 8 is also connected by a rod or flexible member 17ᵃ to an eccentric strap cooperating with eccentric operated by a segment pulley 19ᶜ.

As shown in Figure 2 of the drawings, the control stick 20, by which the rudder is turned, is also connected by means of a flexible member 21 to a lever 22, and said lever 22 is in turn connected to a flexible member 24. The flexible member 24 extends about all the segment pulleys 19, 19ᵃ, 19ᵇ, and 19ᶜ, and is connected thereto so that when this flexible connection 24 is moved in one direction it will rotate the segmental pulleys clockwise, and when it is moved in the opposite direction, it will rotate the segmental pulleys in a counterclockwise direction.

The eccentrics co-operating with the eccentric straps 18 and 18ᵃ are so set that when the segment pulleys connected to these eccentrics are rotated in one direction slack will be given up to the member 16 and the member 17 at the same time will be pulled upon. When the segment pulleys are rotated in the opposite direction, then slack will be given up to the member 17 and the member 16 pulled upon. The same is true of the eccentrics co-operating with the eccentric straps 18ᵇ and 18ᶜ. This mechanism enables the propeller shafts to be tilted forward and aft, and inasmuch as the eccentrics all turn in the same direction and the eccentric straps are on opposite sides of the eccentric on one side of the fuselage from what they are on the other side of the fuselage and when one shaft is tilted forward the shaft on the other side of the fuselage will be tilted aft, and vice versa.

In Fig. 3 I have shown diagrammatically the effect of tilting the propeller shaft. The central line $a$ is the normal position of the propeller shaft. When it is tilted to the position $b$ the force of the propeller is resolved into two components—a horizontal component $x$ and a vertical component $y$. If the propeller shaft is shifted to the position $c$—that is, to the other side of the vertical, then there will be components of force indicated at $x'$ and $y'$. From the diagram, it will be apparent that when one propeller is tilted forward and the other tilted aft, there will be a horizontal component of forces $x$ and $x'$ which will form a couple which will create a turning torque in a horizontal plane. This turning torque in a horizontal plane can be used in conjunction with the rudders to aid in the direction of flight of the helicopter or, if the helicopter is hovering, then this turning torque may be used to keep the helicopter faced in the proper direction.

Furthermore, the shifting of the propeller shafts may be used to overcome any unbalanced torque, if found desirable. It is very difficult to construct the propellers so that the torque of one would absolutely counterbalance the torque of the other, but by my arrangement the axis may be shifted so as to overcome any unbalanced torque which would tend to turn the helicopter from its proper direction of flight. Instead of having means for tilting both propeller shafts it is obvious that the same result may be accomplished, possibly to a less extent, by tilting one propeller shaft only. Furthermore, it is understood that there is enough warping flexibility in the wings of the helicopter to permit the shafts to be slightly inclined to each other, as described, without providing any pivotal support for the shaft.

While I have described the propellers as located upon opposite sides of the longitudinal center of the fuselage, it will be understood that the propellers may be otherwise placed, as, for example, in a plane containing the longitudinal axis of the fuselage. In this case, of course, the propeller shafts will be spaced from each other and normally parallel, and means will be provided for tilting the propeller shafts so as to create a turning torque in a horizontal plane, such as described above.

Having thus described my invention, what I claim as new and desire to secure by Letters Patent, is:

1. A helicopter including in combination, a fuselage, oppositely rotating lifting propellers spaced from each other and having their axes normally parallel and perpendicular to a plane passing longitudinally and centrally from the fuselage, means for rotating said propellers, and means for tilting the axes of the propellers relative to each other in opposite directions and in a direction at right angles to the plane containing the axes of the propellers for creating a turning torque in a horizontal plane.

2. A helicopter including in combination, a fuselage, oppositely rotating propellers located on opposite sides of a center line extending longitudinally of the fuselage, means for tilting one of said propeller shafts forward and aft in a plane substantially parallel with said center line for creating a turning torque in a horizontal plane, said means for tilting the propeller shaft being connected to the rudder control and adapted to co-operate therewith in the turning of the helicopter.

3. A helicopter including in combination, a fuselage, oppositely rotating lifting propellers located on opposite sides of a center line extending longitudinally of the fuselage, means for simultaneously inclining the axes of the propellers in opposite directions fore and aft for producing a turning movement in a horizontal plane for aiding in turning the fuselage to control the flight or for overcoming any unbalanced torque of the propellers.

4. A helicopter including in combination, a fuselage, oppositely rotating lifting propellers located on opposite sides of a center line extending longitudinally of the fuselage, means for simultaneously inclining the axes of the propellers in opposite directions fore and aft for producing a turning movement in a horizontal plane for aiding in turning the fuselage to control the flight or for overcoming any unbalanced torque of the propellers, said means for inclining the axes of the propeller shafts being connected to the control stick for the rudder and so arranged that the inclining of the axes in the propeller shaft causes a turning torque which co-operates with the rudder in turning the helicopter.

In testimony whereof, I affix my signature.

HENRY A. BERLINER.